(12) United States Patent
Ebara et al.

(10) Patent No.: US 8,740,268 B2
(45) Date of Patent: Jun. 3, 2014

(54) BUMPER STRUCTURE

(71) Applicant: Honda Motor Co., Ltd, Tokyo (JP)

(72) Inventors: Yoshiaki Ebara, Wako (JP); Kosuke Katsumata, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/839,207

(22) Filed: Mar. 15, 2013

(65) Prior Publication Data

US 2013/0257070 A1 Oct. 3, 2013

(30) Foreign Application Priority Data

Mar. 29, 2012 (JP) ................................ 2012-075954

(51) Int. Cl.
*B60R 19/02* (2006.01)
(52) U.S. Cl.
USPC ........................... 293/102; 293/121; 293/132
(58) Field of Classification Search
USPC ........... 296/187.02, 187.03, 187.09; 293/102, 293/120–122, 132–136
See application file for complete search history.

(56) References Cited

U.S. PATENT DOCUMENTS

| | | | | |
|---|---|---|---|---|
| 3,744,835 A * | 7/1973 | Carbone et al. | ............... | 293/120 |
| 4,106,804 A * | 8/1978 | Scrivo | ............................ | 293/109 |
| 4,457,547 A * | 7/1984 | Sekiyama et al. | ............ | 293/110 |
| 5,984,389 A * | 11/1999 | Nuber et al. | .................... | 293/109 |
| 6,179,355 B1 * | 1/2001 | Chou et al. | ..................... | 293/132 |
| 6,334,639 B1 * | 1/2002 | Vives et al. | .................... | 293/133 |
| 6,371,540 B1 * | 4/2002 | Campanella et al. | ......... | 293/102 |
| 6,485,072 B1 * | 11/2002 | Werner et al. | .................. | 293/132 |
| 6,709,036 B1 * | 3/2004 | Evans | .......................... | 293/120 |
| 7,059,642 B2 * | 6/2006 | Ohno et al. | .................... | 293/120 |
| 7,296,833 B2 * | 11/2007 | Mohapatra et al. | ........... | 293/121 |
| 7,810,858 B2 * | 10/2010 | Frederick et al. | ............. | 293/120 |
| 7,954,864 B2 * | 6/2011 | Frederick et al. | ............. | 293/120 |
| 7,988,225 B2 * | 8/2011 | Goldsberry | .............. | 296/193.09 |
| 8,517,454 B1 * | 8/2013 | Huber et al. | .............. | 296/187.09 |
| 2010/0102577 A1 * | 4/2010 | Ginja et al. | .................... | 293/102 |
| 2010/0244487 A1 * | 9/2010 | Gonin et al. | ............. | 296/187.09 |
| 2013/0257070 A1 * | 10/2013 | Ebara et al. | .................... | 293/132 |

FOREIGN PATENT DOCUMENTS

| | | | |
|---|---|---|---|
| JP | 2006-213105 A | | 8/2006 |
| JP | 2007-182162 A | | 7/2007 |
| JP | 2008-056081 A | | 3/2008 |
| JP | 2010-042783 A | | 2/2010 |

* cited by examiner

*Primary Examiner* — Glenn Dayoan
*Assistant Examiner* — Gregory Blankenship
(74) *Attorney, Agent, or Firm* — Westerman, Hattori, Daniels & Adrian, LLP

(57) ABSTRACT

A bumper structure includes a bumper beam that extends in a vehicle width direction and a bumper absorber that is provided along a front surface of the bumper beam and that has an opening in a top center portion of the bumper absorber in the vehicle width direction. The bumper beam includes a center portion that extends parallel to the vehicle width direction and a pair of oblique portions that obliquely extend backward and outward in the vehicle width direction from respective ends of the center portion. The bumper absorber includes a pair of load receiving portions outside the opening in the vehicle width direction, and the load receiving portions are arranged at positions corresponding to a pair of bent portions that are formed at boundaries between the center portion and the respective oblique portions.

11 Claims, 10 Drawing Sheets

BUMPER STRUCTURE

CROSS REFERENCES TO RELATED APPLICATIONS

The present application claims priority under 35 U.S.C. §119 to Japanese Patent Application No. 2012-075954, filed Mar. 29, 2012, entitled "Bumper Structure." The contents of this application are incorporated herein by reference in their entirety.

TECHNICAL FIELD

The present disclosure relates to bumper structures, and more specifically, to a bumper structure capable of suppressing the occurrence of underride collision and providing appropriate absorption of a collision load.

BACKGROUND

Bumper structures including a recessed opening formed in a top center portion in a vehicle width direction of an impact absorption member which is attached on a front surface of a front bumper beam have been disclosed.

For example, in bumper structures disclosed (especially depicted with figures) in Japanese Unexamined Patent Application Publication Nos. 2007-182162 and 2008-056081, a protruding portion is formed in a top center portion of an impact absorption member in a vehicle width direction, and the protruding portion is depressed into a triangular shape so as to fit the shape of a front grill.

In a bumper structure disclosed in Japanese Unexamined Patent Application Publication No. 2006-213105, an impact absorption member is formed so that the cross section of a center portion of the impact absorption member in a vehicle width direction has a smaller height and thickness than the cross sections of ends of the impact absorption member in the vehicle width direction, and there is a space between a front surface of the impact absorption member and a bumper face.

In a bumper structure disclosed in Japanese Unexamined Patent Application Publication No. 2010-042783, two ribs are formed on a top surface of an impact absorption member, and an opening is formed between these ribs.

However, in the case where the bumper structures described in Japanese Unexamined Patent Application Publication Nos. 2007-182162 and 2008-056081 are employed, when a vehicle collides with the other vehicle having a height greater than that of the vehicle, there will be an unsquashed portion of the impact absorption member of the vehicle sandwiched between the bumper of the other vehicle and the bumper beam of the vehicle. When there is an unsquashed portion, a downward moment is produced due to a difference in the amount of squash between the top and bottom portions thereof. The downward moment causes the impact absorption member to slide downward, and as a result, a phenomenon called underride in which the vehicle runs underneath the other vehicle occurs. When the underride occurs, the bumper structures may not be able to appropriately absorb a collision load.

On the other hand, in the case where the bumper structures described in Japanese Unexamined Patent Application Publication Nos. 2006-213105 and 2010-042783 are employed, since an opening is formed in the top center portion of the impact absorption member of the vehicle in the vehicle width direction, the bumper of the other vehicle collides with the bumper beam via the opening when the vehicle collides with the other vehicle having a height greater than that of the vehicle. Thus, only a small portion of the impact absorption member is squashed, and the underride does not occur. However, there is a problem that since only a small portion of the impact absorption member is squashed, a load will not be distributed by the impact absorption member, and the collision load will concentrate in a limited area in the vicinity of the center of the bumper beam. As a result, the collision load will not be appropriately absorbed.

SUMMARY

The present application describes a bumper structure capable of suppressing the occurrence of underride and absorbing a collision load by providing appropriate load distribution when vehicles having different heights collide with each other.

The bumper structure according to the present disclosure includes a bumper beam that is supported by right and left frames of a vehicle body and that extends in a vehicle width direction and a bumper absorber that is provided along a front surface of the bumper beam and that has an opening in the center portion of the bumper absorber in the vehicle width direction. The bumper beam includes a center portion that extends parallel to the vehicle width direction and a pair of oblique portions that obliquely extend backward and outward in the vehicle width direction from respective ends of the center portion. The bumper absorber includes a pair of load receiving portions outside of the opening in the vehicle width direction, and the load receiving portions are arranged at positions corresponding to a pair of bent portions that are formed at boundaries between the center portion and the respective oblique portions.

In such a configuration, the bumper absorber includes the opening in the top center portion thereof in the vehicle width direction, and thus, upon colliding with the other vehicle having a height greater than that of the vehicle, there will be no unsquashed portion of the bumper absorber, and the occurrence of underride may be suppressed. The pair of load receiving portions formed outside of the opening in the vehicle width direction are arranged at the positions corresponding to the pair of bent portions of the bumper beam, and thus, the collision load may be distributed and transferred to the pair of bent portions so as to be appropriately absorbed.

It is desirable that the vehicle body include a bumper grill that is arranged in front of the bumper absorber and makes the outside air flow into a power unit accommodating chamber of the vehicle body, and it is desirable that side edges of the opening be located at respective intersection points of a bottom edge of the bumper grill and a top edge of the bumper beam when viewed from a front side of the vehicle.

In such a configuration, the opening extends between the intersection points of the bottom edge of the bumper grill and the top edge of the bumper beam when viewed from the front side of the vehicle, and thus, the bumper absorber will not be squashed by the bumper grill, and the occurrence of underride may be suppressed when the vehicles having different heights collide with each other. As a result, appropriate load absorption may be provided upon collision.

It is desirable that the bumper beam include a hollow portion that is formed so as to extend in the vehicle width direction and a partition wall that extends in the front-rear direction of the vehicle body so as to partition the hollow portion in the up-down direction, and it is desirable that a lower end of the opening be arranged at a position corresponding to the partition wall. The lower end of the opening may be aligned with the partition wall in the up-down direction of the vehicle body.

In such a configuration, when a bumper of the other vehicle comes into contact with a front wall of the bumper beam through the opening, the collision load is distributed to a top wall and the partition wall of the bumper beam and transferred to a rear wall of the bumper beam via the top wall and the partition wall, and thus, the collision load may be appropriately distributed and absorbed.

It is desirable that the bumper absorber be made of a foamed resin and be configured to have different expansion ratios in the load receiving portions from other portions.

In such a configuration, the bumper absorber is made of a foamed resin and has different expansion ratios in the load receiving portions from other portions, and thus, appropriate distribution and absorption of the collision load may be achieved in a vehicle collision.

It is desirable that the bumper absorber include a recess that extends in the vehicle width direction in the vicinity of the center of the bumper absorber in the up-down direction of the vehicle.

In such a configuration, the bumper absorber includes the recess, which extends in the vehicle width direction, in the vicinity of the center of the bumper absorber in the up-down direction of the vehicle, and thus, a portion of the bumper absorber above the recess may be squashed uniformly in the up-down direction. As a result, the occurrence of underride may be suppressed, and appropriate absorption of the collision load may be provided.

The present disclosure provides a bumper structure capable of suppressing the occurrence of underride and absorbing a collision load by providing appropriate load distribution when vehicles having different heights collide with each other.

BRIEF DESCRIPTION OF THE DRAWINGS

The advantages of the disclosure will become apparent in the following description taken in conjunction with the following drawings.

DETAILED DESCRIPTION

Figure 1:
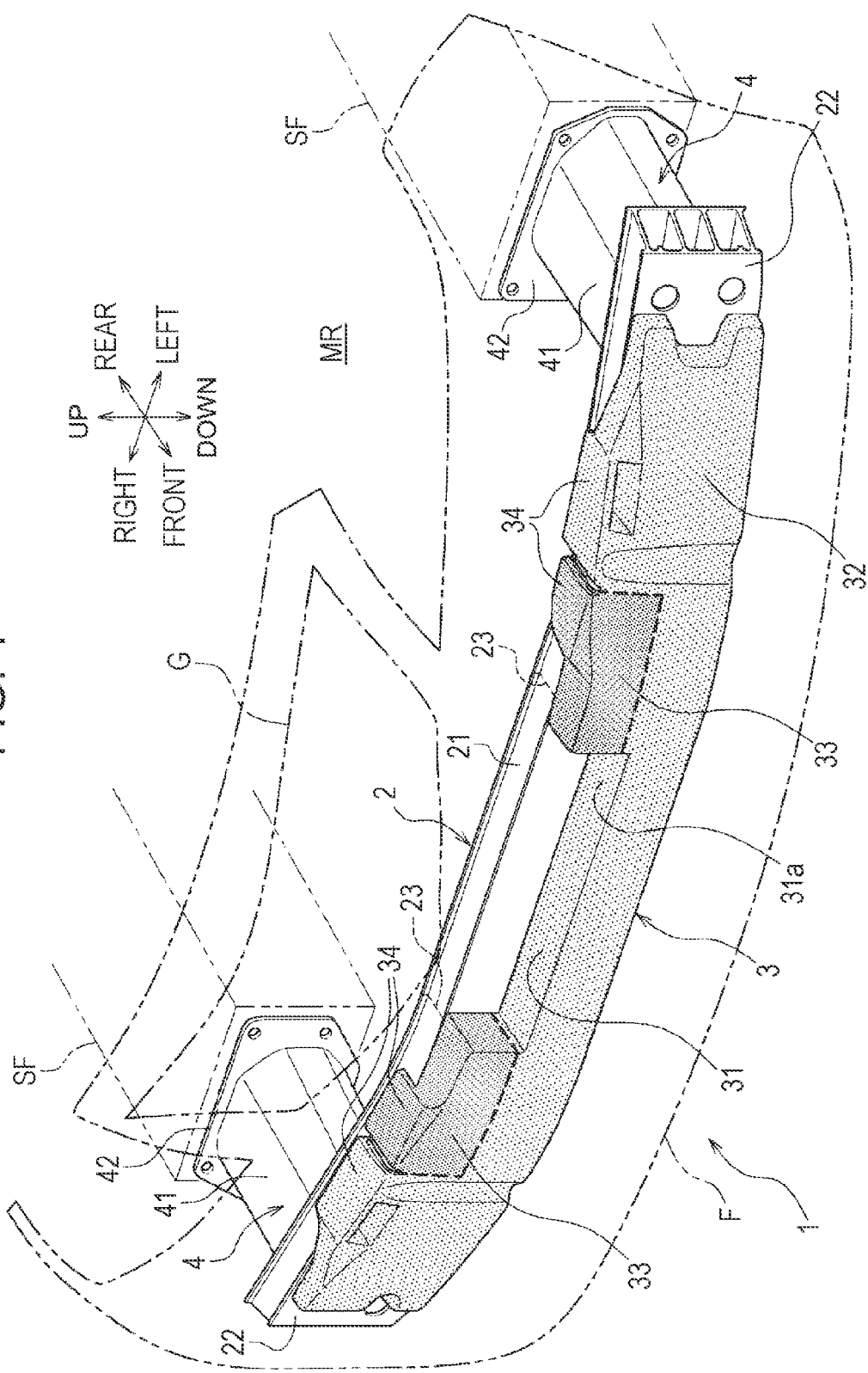
FIG. 1 is an upper left front perspective view of a bumper structure according to a first embodiment.

A first embodiment of the present disclosure will be described in detail with reference to FIGS. 1 to 7B. In the following description, like elements will be denoted by like reference numerals, and repeated descriptions will be avoided. Directions described in the present application are based on the front, rear, right, left, up, and down directions as viewed by the driver of a vehicle. A vehicle width direction is the same as the right-left direction.

Figure 2:
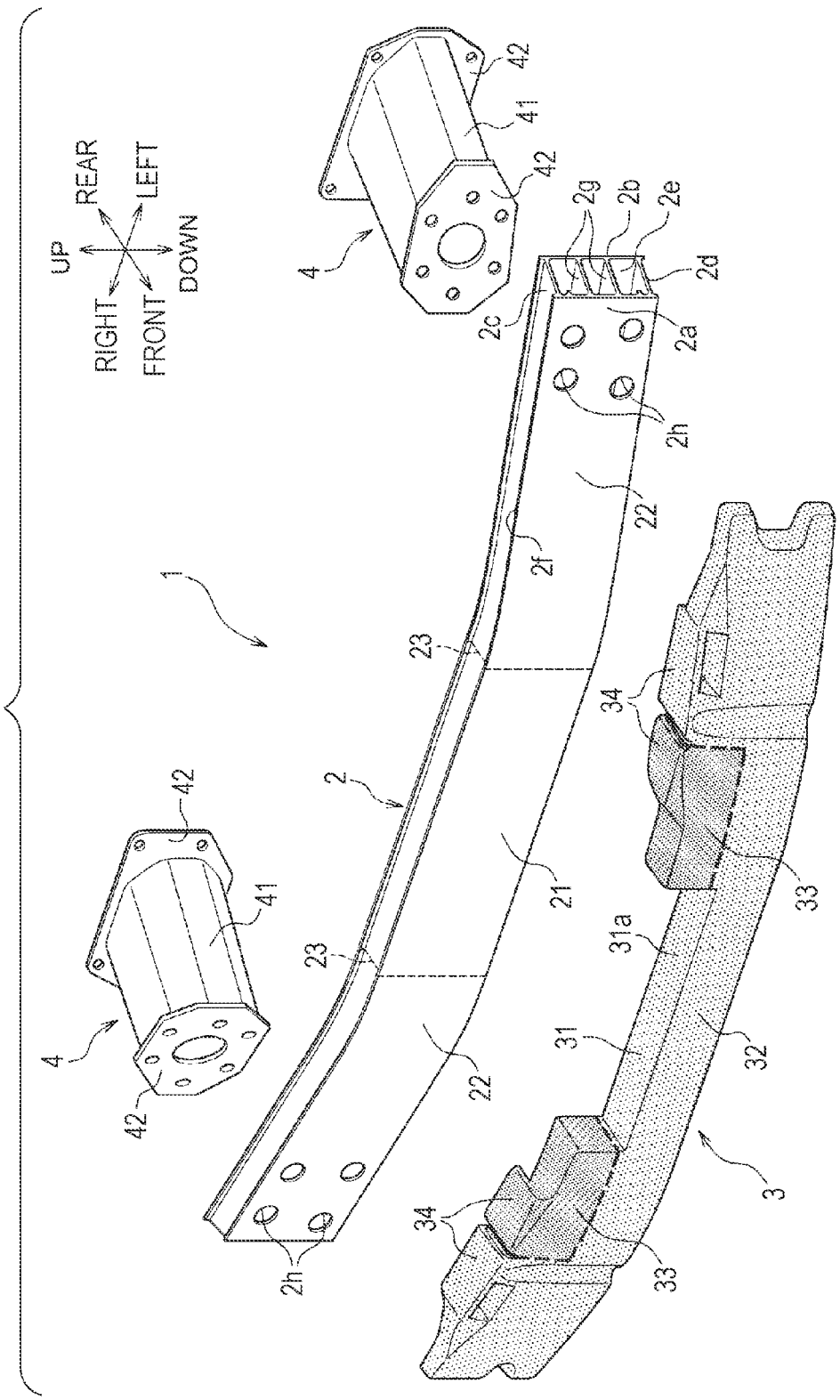
FIG. 2 is an exploded perspective view of the bumper structure.

As shown in FIGS. 1 and 2, a bumper structure 1 according to the first embodiment is an apparatus that absorbs a collision load when the vehicle collides with another vehicle and is provided, for example, in a front end of the vehicle. The bumper structure 1 includes a bumper beam 2, a bumper absorber 3 that is provided on a front surface of the bumper beam 2, and a pair of bumper extensions 4 and 4 that are provided at both ends of the bumper beam 2 on the rear surface thereof.

Figure 4:
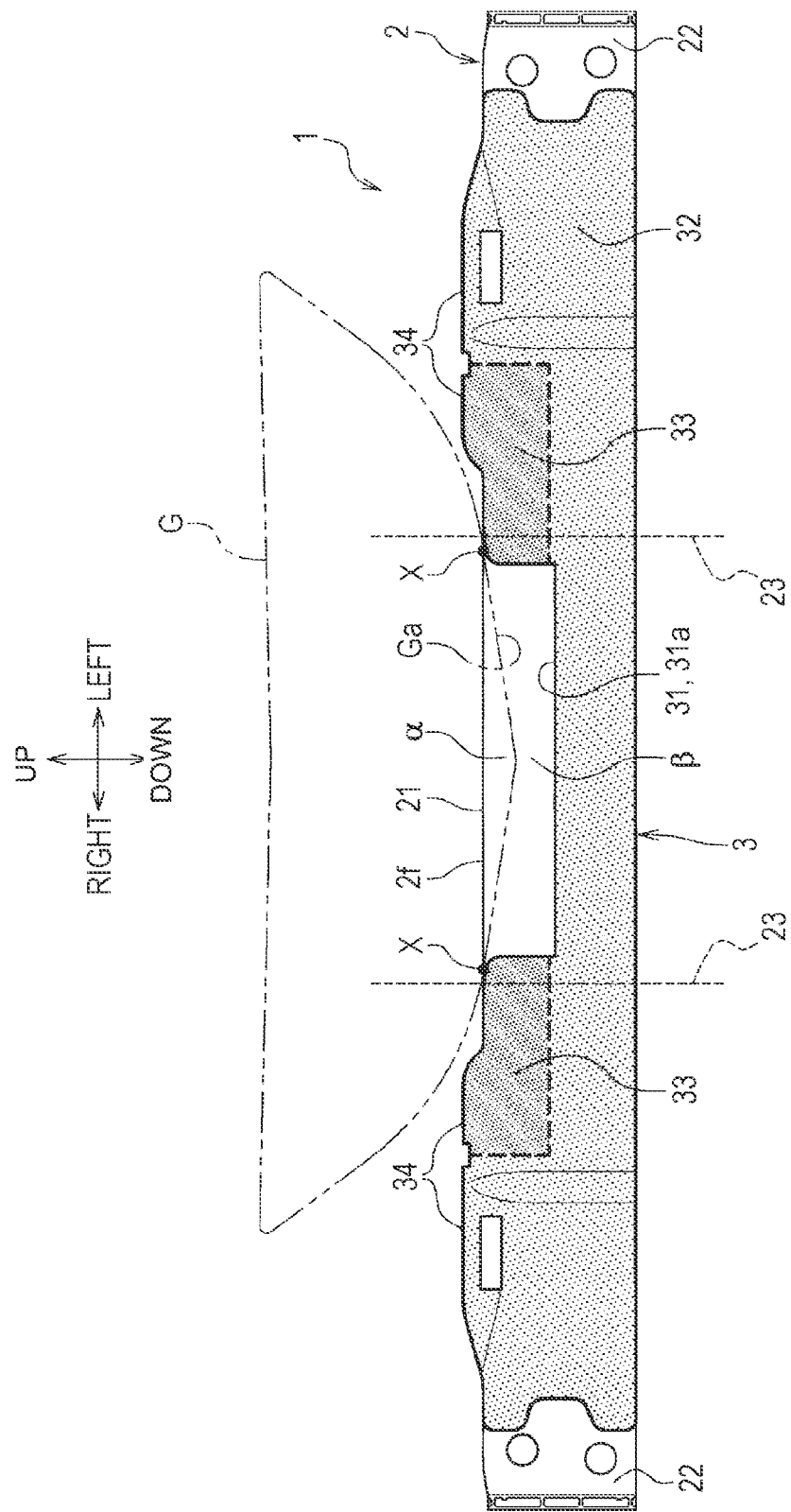
FIG. 4 is a front view of the bumper structure.

A bumper face F and a front grill G are disposed in front of the bumper structure 1. The bumper face F covers the bumper structure 1. The front grill G is a grid-shaped member for guiding the outside air to flow into a power unit accommodating chamber MR (see FIG. 1). The power unit accommodating chamber MR is disposed in the rear of the bumper structure 1. A pair of front side frames SF and SF is formed so as to extend in the front-rear direction on the right and left sides of the power unit accommodating chamber MR. As shown in FIG. 4, a bottom edge Ga of the front grill G is inclined to form a V-shape.

Figure 5:
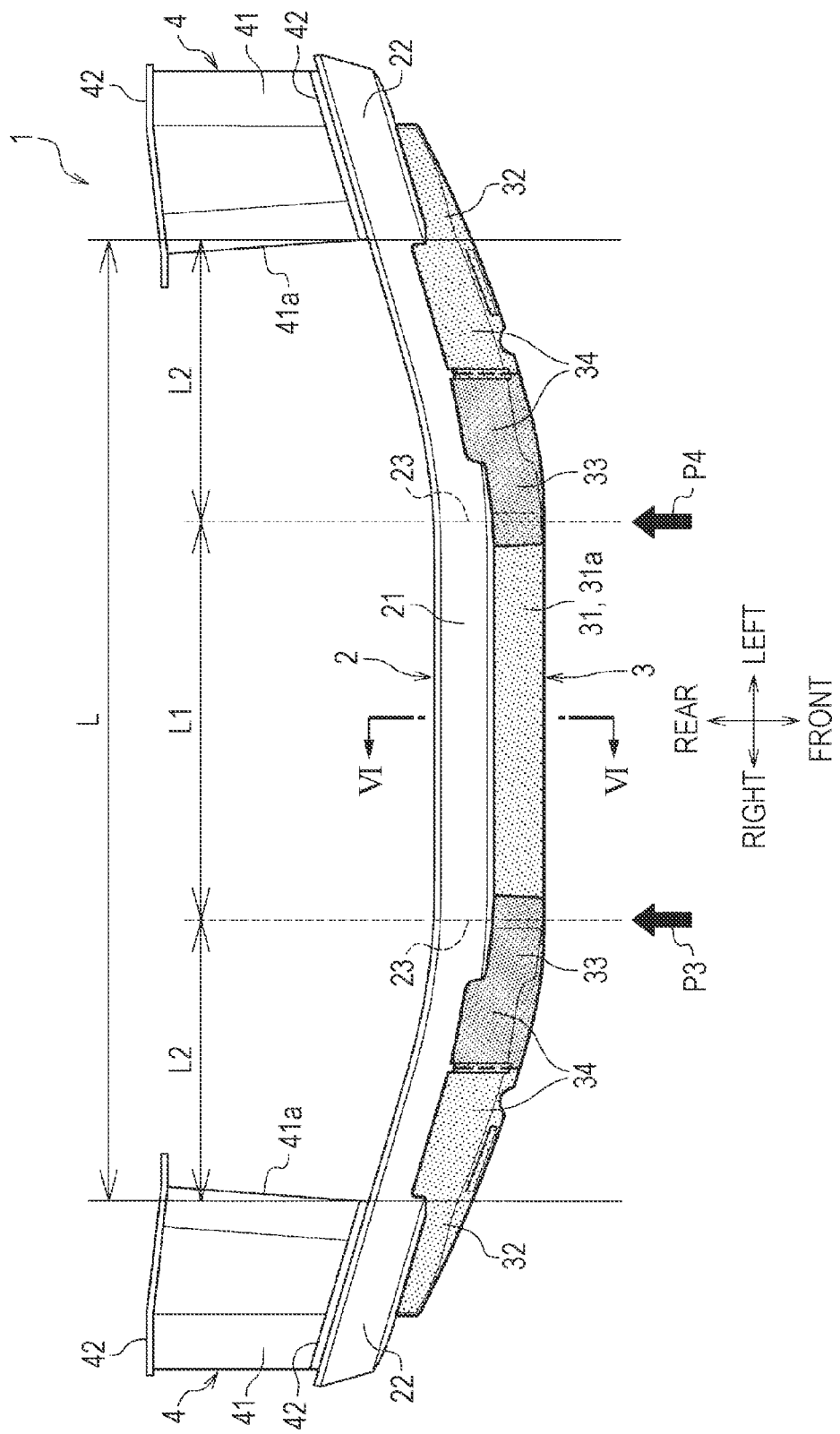
FIG. 5 is a plan view of the bumper structure.

As shown in FIGS. 1, 2, 5, and 6, the bumper beam 2 is a hollow frame member that is formed so as to extend in the vehicle width direction. The bumper beam 2 includes a center portion 21 that extends parallel to the vehicle width direction and a pair of oblique portions 22 and 22 that obliquely extend backward and outward in the vehicle width direction from ends of the center portion 21. In other words, the center portion 21 and the oblique portions 22 are connected to one another at an angle in plan view (see FIG. 5). This continuous bending structure may be formed by bending the bumper beam at the two positions to form a trapezoidal shape. Portions that are bent at boundaries between the center portion 21 and the oblique portions 22 constitute bent portions 23 and 23. Note that, as shown in FIG. 5, a distance L1 between the bent portions 23 and 23 is set substantially equal to a distance L2 between an inner wall 41$a$ of each of the bumper extensions 4 and the corresponding bent portion 23 (L1=L2=⅓L).

Figure 6:
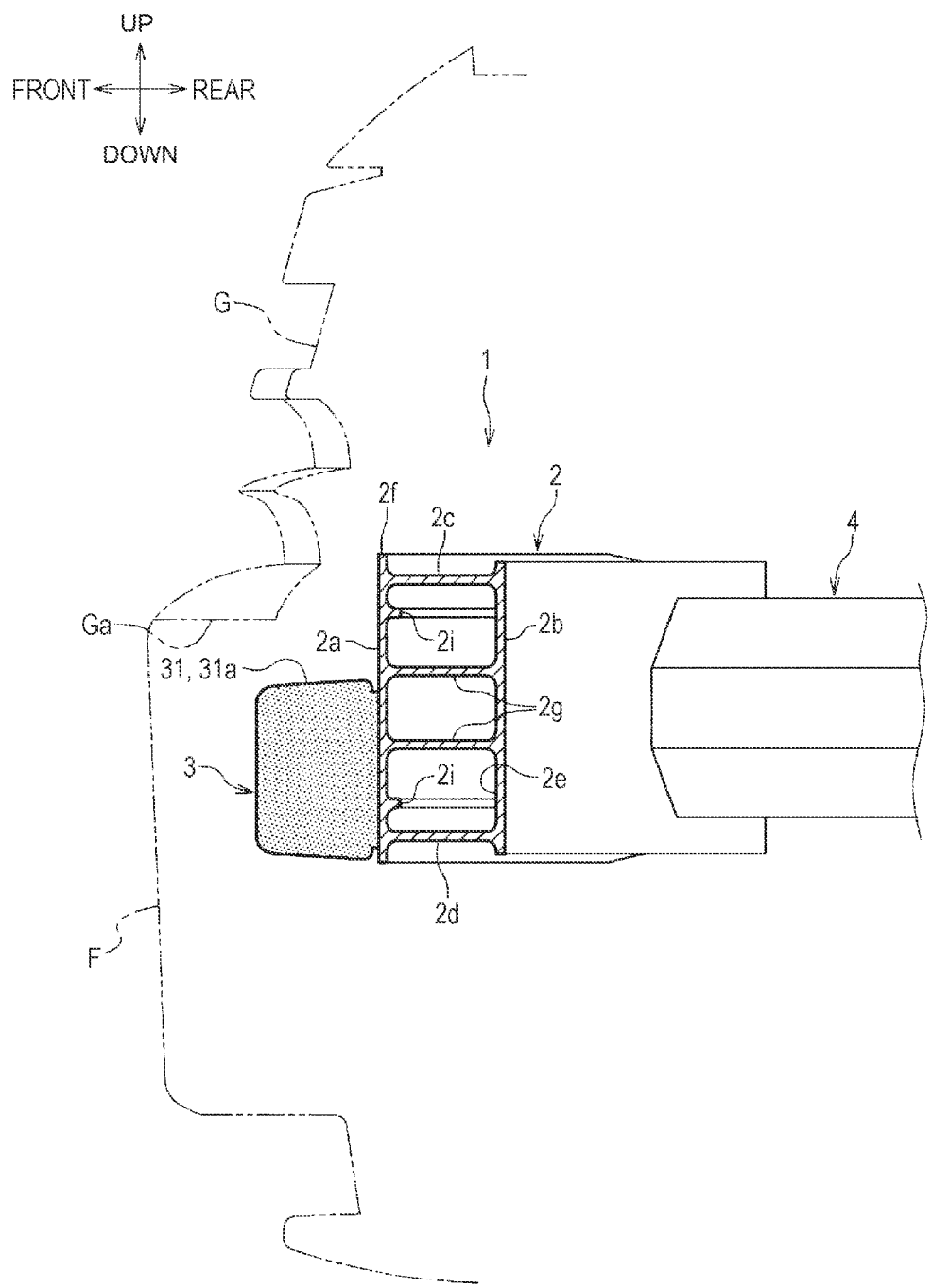
FIG. 6 is a cross-sectional view taken along line VI-VI of FIG. 5.

As shown in FIGS. 2 and 6 (mainly FIG. 6), the bumper beam 2 includes a front wall 2$a$, a rear wall 2$b$, a top wall 2$c$, a bottom wall 2$d$, and a hollow portion 2$e$ surrounded by these walls that has a rectangular shape when viewed in cross section. An upper end of the front wall 2$a$ protrudes upward higher than the top wall 2$c$ so as to form a ridge 2$f$. Two partition walls 2$g$ and 2$g$ that partition the hollow portion 2$e$ into three portions in the up-down direction are provided in the hollow portion 2$e$. Two ribs 2$i$ and 2$i$ are formed on a rear surface of the front wall 2$a$ between the top wall 2$c$ and the partition wall 2$g$, and the bottom wall 2$d$ and the partition wall 2$g$. As shown in FIG. 2, four circular through holes 2$h$ are formed in each of the right and left ends of the front wall 2$a$.

As shown in FIGS. 1, 2, and 3, the bumper absorber 3 is an impact absorption member that is made of a foamed resin and attached to the front wall 2$a$ of the bumper beam 2. The bumper absorber 3 has a function of distributing and transferring the collision load to the bumper beam 2 by its deformation in a vehicle collision. The bumper absorber 3 is formed so as to extend in the vehicle width direction and is bent (curved) along the shape of the front surface of the bumper beam 2. An opening 31 that is an open space extending in the front-rear direction is formed in a top center portion of the bumper absorber 3 in the vehicle width direction. The opening 31 is formed downward from a top surface of the bumper absorber 3 so as to make a recess and cause the front wall 2a of the bumper beam 2 to be exposed. A bottom end 31a of the opening 31 is formed at a position corresponding to the partition wall 2g that is the upper partition wall 2g of the bumper beam 2 (see FIG. 6).

The bumper absorber 3 includes an absorber main body 32 made of a foamed resin having a relatively high expansion ratio (e.g., 13.5) and a pair of load receiving portions 33 and 33 made of a foamed resin having a relatively low expansion ratio (e.g., 5). The load receiving portions 33 and 33 are portions that receive a load by coming into contact with the bumper of the other vehicle when the vehicle collides with the other vehicle having a height greater than that of the vehicle. The load receiving portions 33 and 33 are formed outside the opening 31 in the vehicle width direction. In other words, the opening 31 is formed between the pair of load receiving portions 33 and 33. The pair of load receiving portions 33 and 33 are arranged at positions corresponding to the pair of bent portions 23 and 23 of the bumper beam 2. Because of this, a collision load that acts on the load receiving portions 33 and 33 is transferred to the pair of bent portions 23 and 23 of the bumper beam 2.

The absorber main body 32 and the load receiving portions 33 of the bumper absorber 3 may be integrally formed by, for example, co-injection molding. The above-mentioned expansion ratios are examples, and the present disclosure is not limited thereto.

Figure 3A:
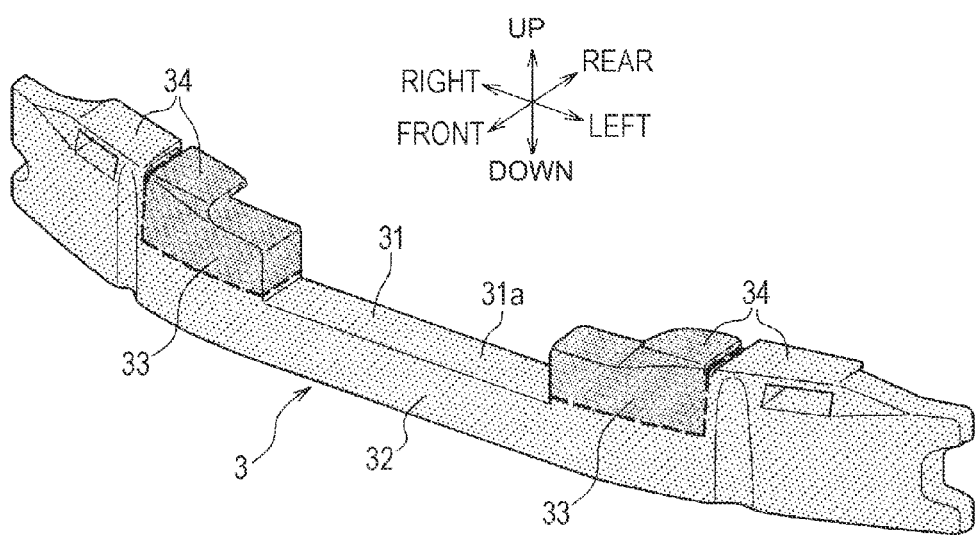
FIG. 3A is an upper left front perspective view of a bumper absorber.
Figure 3B:
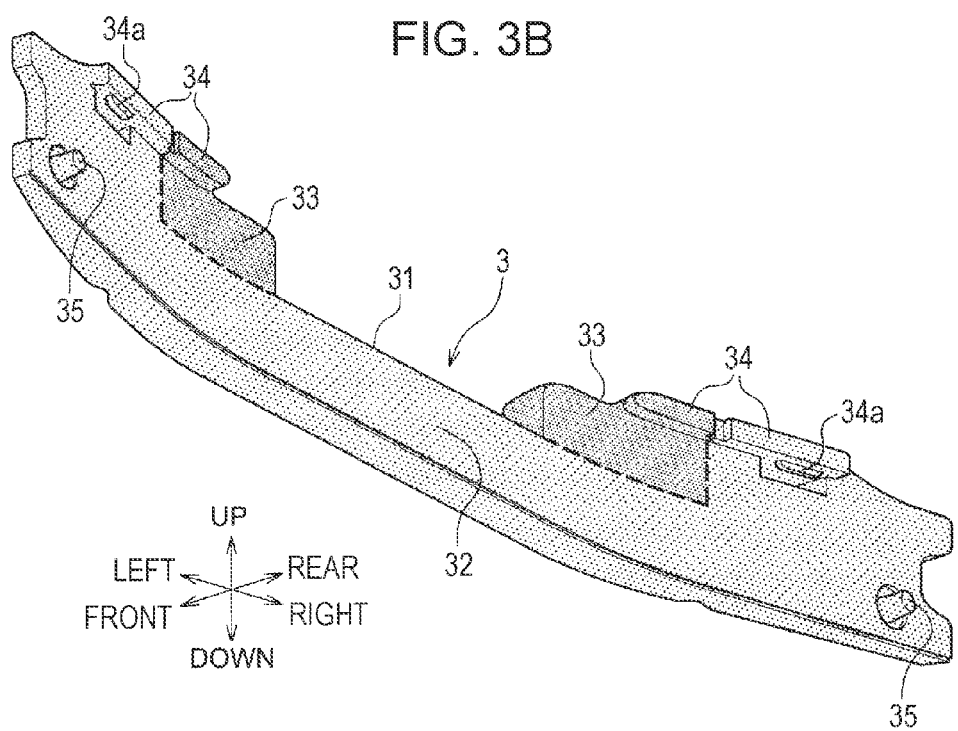
FIG. 3B is a lower left rear perspective view of the bumper absorber.

As shown in FIGS. 3A and 3B, extension portions 34 and 34 that extend above the bumper beam 2 are formed on the right and left sides of the top surface of the bumper absorber 3. Each of the extending portions 34 is formed over the absorber main body 32 and the corresponding load receiving portion 33. As shown in FIG. 3B, latch anchors 34a that latch onto the ridge 2f of the bumper beam 2 are formed so as to protrude from the bottom surfaces of the respective extending portions 34.

The latch anchors 34a are formed within regions corresponding to the respective oblique portions 22 on the right and left sides of the bumper beam 2 (see FIGS. 2 and 5). Locating bosses 35 and 35 are formed so as to project from the right and left sides of a rear surface of the bumper absorber 3. Each of the locating bosses 35 and 35 fits into one of the four circular through holes 2h formed on each of the right and left ends of the front wall 2a of the bumper beam 2.

The bumper extensions 4 are box-like members that absorb an impact by deforming in the front-rear direction in a vehicle collision. As shown in FIGS. 1 and 2, each extension 4 includes a trunk portion 41 that is hollow and has a substantially octagonal shape when viewed in cross section and connection plates 42 and 42 that are provided in the front and rear of the trunk portion 41. The connection plates 42 at the rear of the trunk portions 41 are fixed to front ends of the respective front side frames SF. The connection plates 42 at the front of the trunk portions 41 are fixed on the right and left portions of the rear wall 2b of the bumper beam 2.

As shown in FIG. 4, side edges of the opening 31 are located at respective intersection points X of the bottom edge Ga of the front grill G and the top edge of the bumper beam 2 (the ridge 2f) when viewed from the front of the vehicle. In other words, the bottom edge Ga of the front grill G and the opening 31 are superposed with each other, and the bottom edge Ga and the bumper absorber 3 are not superposed with each other when viewed from the front of the vehicle. Thus, when the vehicle collides with the other vehicle having a height greater than that of the vehicle, the bumper absorber 3 will not be squashed by the front grill G. As a result, there will be no unsquashed portion of the bumper absorber 3, and underride will be suppressed.

As shown in FIG. 4, when viewed from the front of the vehicle, for a region where the opening 31 and the bumper beam 2 are superposed with each other, the area of a region β where the front grill G and the bumper beam 2 are not superposed with each other is larger than the area of a region α where the front grill G and the bumper beam 2 are superposed with each other (i.e., α<β).

Although it is preferable to remove not only the portion corresponding to the opening 31 but also the whole upper half of the bumper absorber 3 including portions on the right and left sides of the opening 31 in view of suppressing underride, this could cause the load-absorbing function of the bumper absorber 3 to be impaired, and as a result, the bumper absorber 3 may not be able to appropriately absorb the collision load. Therefore, as described above, the area of the region α and the size of the opening 31 (the area of the region β) are adjusted in order to balance securing the volume of the bumper absorber 3 that fulfills the load-absorbing function with reducing a portion over which the bumper of the other vehicle laps for suppressing the occurrence of underride.

The bumper structure 1 according to the first embodiment is configured as described above. Advantageous effects of the bumper structure 1 will now be described with reference to FIGS. 1 to 7B (mainly FIGS. 7A, 7B, 4, and 5).

Figure 7A:
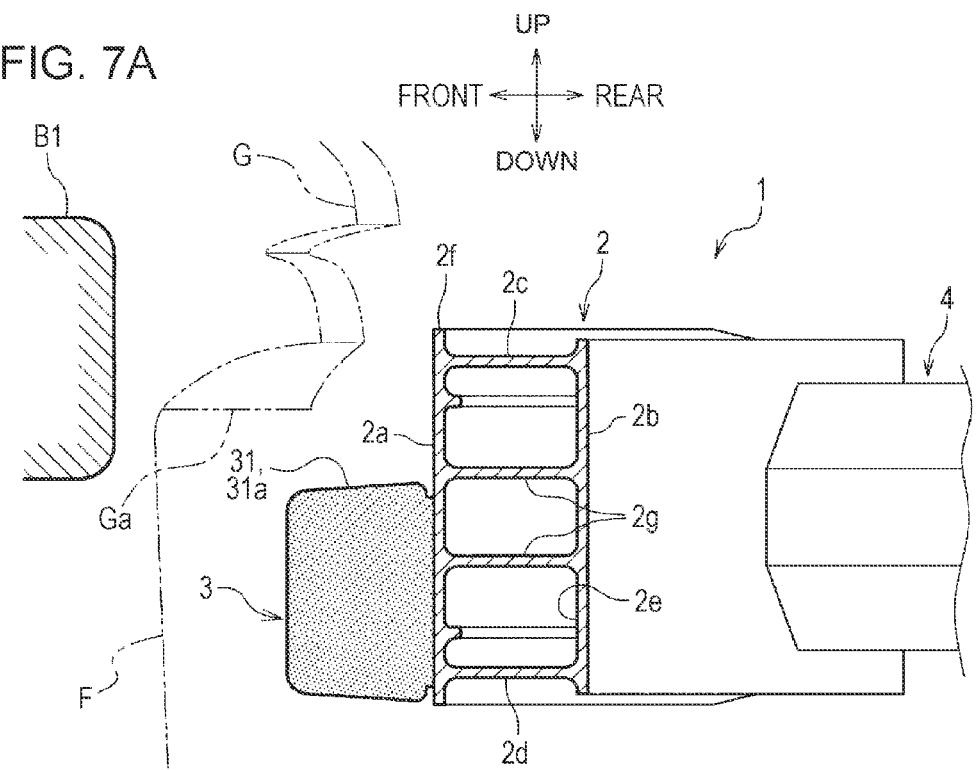
FIG. 7A is a cross-sectional view of the bumper structure immediately prior to a collision.

As shown in FIG. 7A, a bumper B1 of another vehicle having a height greater than that of the vehicle is disposed at a level corresponding to that of the opening 31 of the bumper structure 1. The bumper face F and the front grill G are present between the bumper B1 and the bumper beam 2 in the vicinity of a center portion in the vehicle width direction, and the bumper absorber 3 is not present therebetween.

Figure 7B:
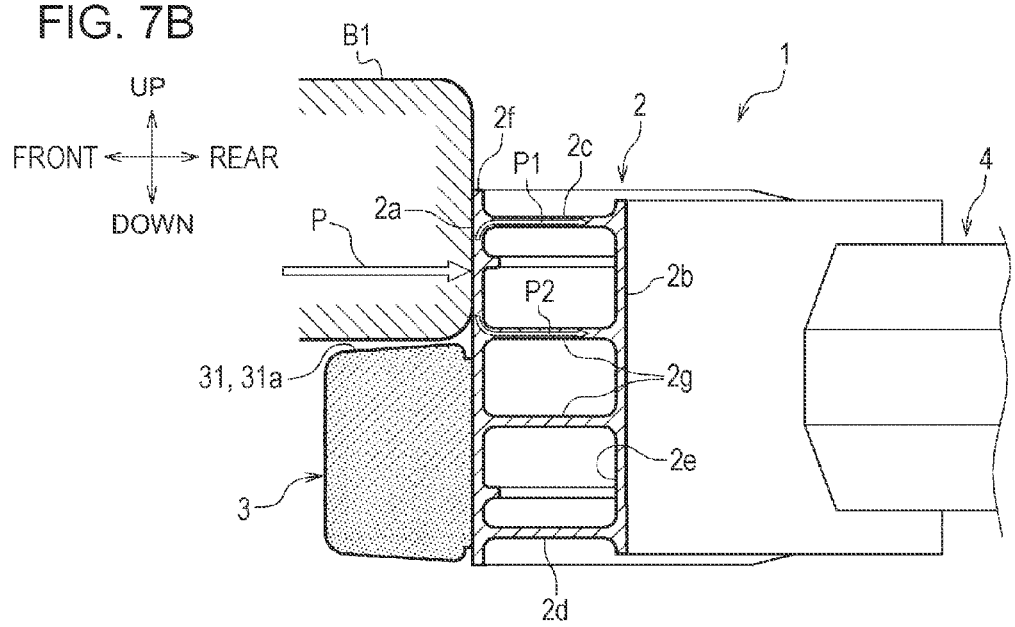
FIG. 7B is a cross-sectional view of the bumper structure immediately after the collision.

As shown in FIG. 7B, when the vehicle, which includes the bumper structure 1, collides with the bumper B1 of the other vehicle having a height greater than that of the vehicle, the bumper B1 comes into contact with the front wall 2a of the bumper beam 2 through the opening 31 while crushing the bumper face F and the front grill G. In this case, no unsquashed portion of the bumper absorber 3 will be produced in the vicinity of the center portion in the vehicle width direction, and thus, the occurrence of underride may be suppressed. Since underride is suppressed, the bumper beam 2 will not tilt downward, and thus, the bumper B1 of the other vehicle comes into contact uniformly with the bumper beam 2 in the up-down direction.

The lower end 31a of the opening 31 is formed at a position corresponding to the upper partition wall 2g of the bumper beam 2, and thus, a collision load P of the bumper B1 of the other vehicle will be distributed and transferred to the upper partition wall 2g and the top wall 2c via the front wall 2a of the bumper beam 2 (see arrows P1 and P2). Therefore, the bumper beam 2 may appropriately receive the collision load P.

On the other hand, in the vicinity of the side edges of the opening 31, collision loads P3 and P4 (each of which is ½P) of the bumper B1 of the other vehicle act on respective bent portions 23 and 23 via the respective load receiving portions 33 and 33 as shown in FIG. 5. The collision loads P3 and P4 acted on the respective bent portions 23 and 23 are received by the respective bumper extensions 4 and 4 via the bumper beam 2. In this case, since the distance L1 between the bent portions 23 and 23 is set to be substantially equal to the distance L2 between the inner wall 41a of each of the bumper extensions 4 and the corresponding bent portion 23 (L1=L2=⅓L), the bending moment Mc and the deflection δc in a center portion of the bumper beam 2 will be Mc=PL/6 and δc=23 PL^3/1296 EI, respectively, when calculated using the calculation formula for a simple beam structure.

In contrast, if the load receiving portions 33 and 33 are not formed, the collision load P will concentrate in and act on the center portion of the bumper beam 2 (L/2), and the hypothetical bending moment Mc' and the hypothetical deflection δc' in the center portion of the bumper 2 will be Mc'=PL/4 and δc'=PL^3/48 EI, respectively.

Therefore, it is understood that, in the bumper structure 1 according to the first embodiment, the bending moment Mc and the deflection δc are reduced to 0.75 (⅔) times and 0.85 (²³⁄₂₇) times, respectively, those in the case where the collision load P concentrates in and acts on the center portion of the bumper beam 2. Thus, the section modulus and the load-absorbing stroke of the bumper beam 2 may be reduced.

As described above, in the bumper structure 1 according to the first embodiment, the bumper absorber 3 includes the opening 31 in the top center portion thereof in the vehicle width direction, and thus, there will be no unsquashed portion of the bumper absorber 3 when the vehicle collides with the bumper B1 of another vehicle having a height greater than that of the vehicle. As a result, the occurrence of underride may be suppressed. The pair of load receiving portions 33 and 33 formed on the outside the opening 31 in the vehicle width direction are arranged at positions corresponding to the pair of bent portions 23 and 23 of the bumper beam 2, so that the collision load P may be distributed and transferred to the pair of bent portions 23 and 23 so as to be appropriately absorbed.

In the bumper structure 1 according to the first embodiment, the opening 31 extends between the intersection points X of the bottom edge Ga of the front grill G and the top edge of the bumper beam 2 (the ridge 2f) when viewed from the front of the vehicle, and thus, the bumper absorber 3 will not be crushed by the front grill G, and the occurrence of underride may be suppressed when vehicles having different heights collide with each other. As a result, appropriate load absorption may be provided upon collision.

In the bumper structure 1 according to the first embodiment, when the bumper B1 of the other vehicle comes into contact with the front wall 2a of the bumper beam 2 through the opening 31, the collision load P is distributed to the top wall 2c and the upper partition wall 2g of the bumper beam 2 and transferred to the rear wall 2b, and thus, the collision load P may be appropriately distributed and absorbed.

In the bumper structure 1 according to the first embodiment, the bumper absorber 3 includes the absorber main body 32 having a relatively high expansion ratio (e.g., 13.5) and the pair of load receiving portions 33 and 33 having a relatively low expansion ratio (e.g., 5), and thus, appropriate distribution and absorption of the collision load P may be provided in a vehicle collision.

A bumper structure 10 according to a second embodiment of the present disclosure will now be described in detail with reference to FIGS. 8 to 10. In the following description, elements that are the same as in the above-described first embodiment will be denoted by the same reference numerals, and repeated descriptions will be avoided.

Figure 8:
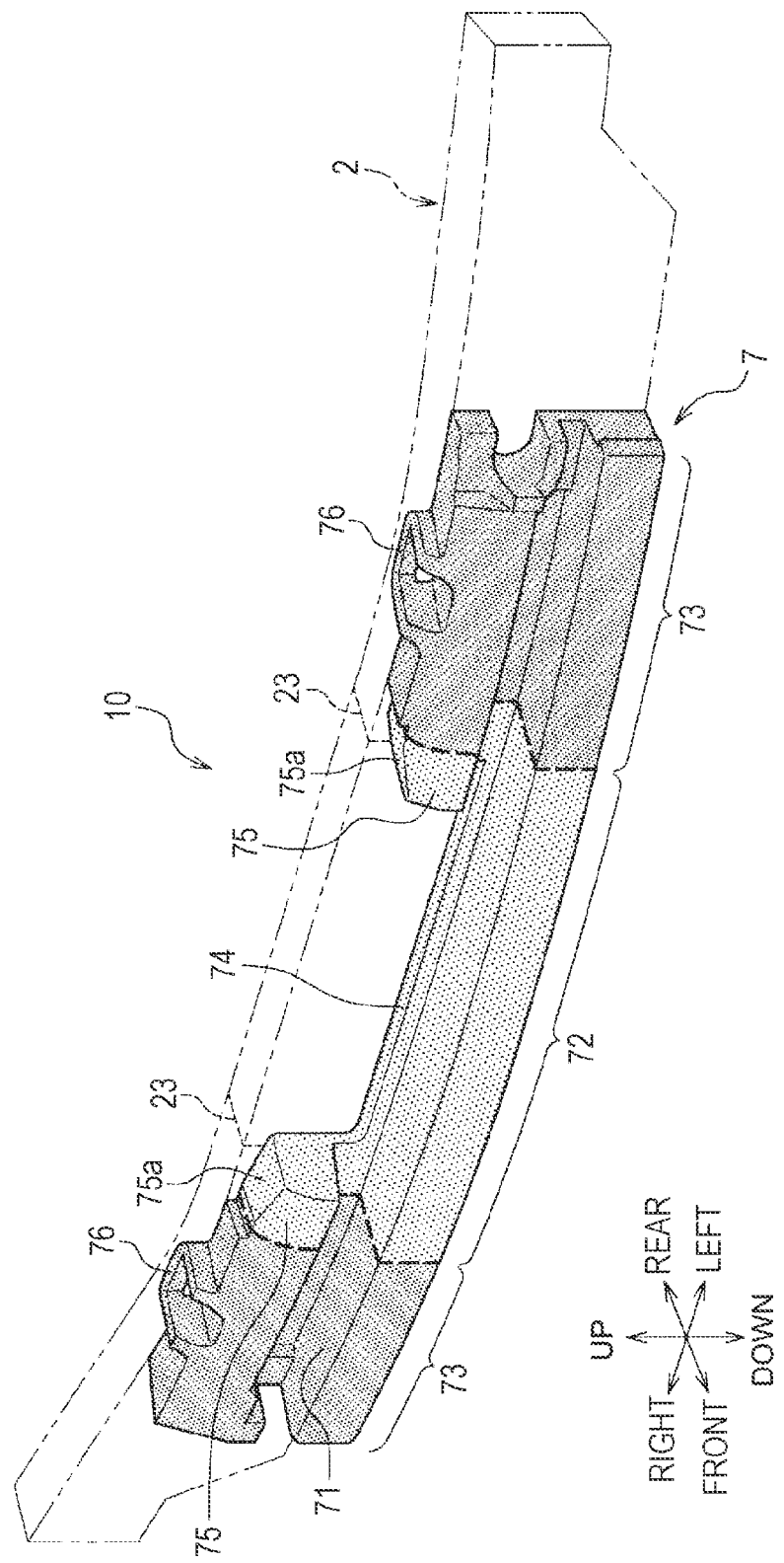
FIG. 8 is an upper left front perspective view of a bumper structure according to a second embodiment.

FIG. 8 is an upper left front perspective view of a bumper structure according to the second embodiment. FIG. 9 is a front view of the bumper structure according to the second embodiment. FIG. 10 is a cross-sectional view taken along line X-X of FIG. 9. Note that the bumper beam 2 is illustrated by imaginary lines (two-dot chain lines) in FIG. 8.

Figure 9:
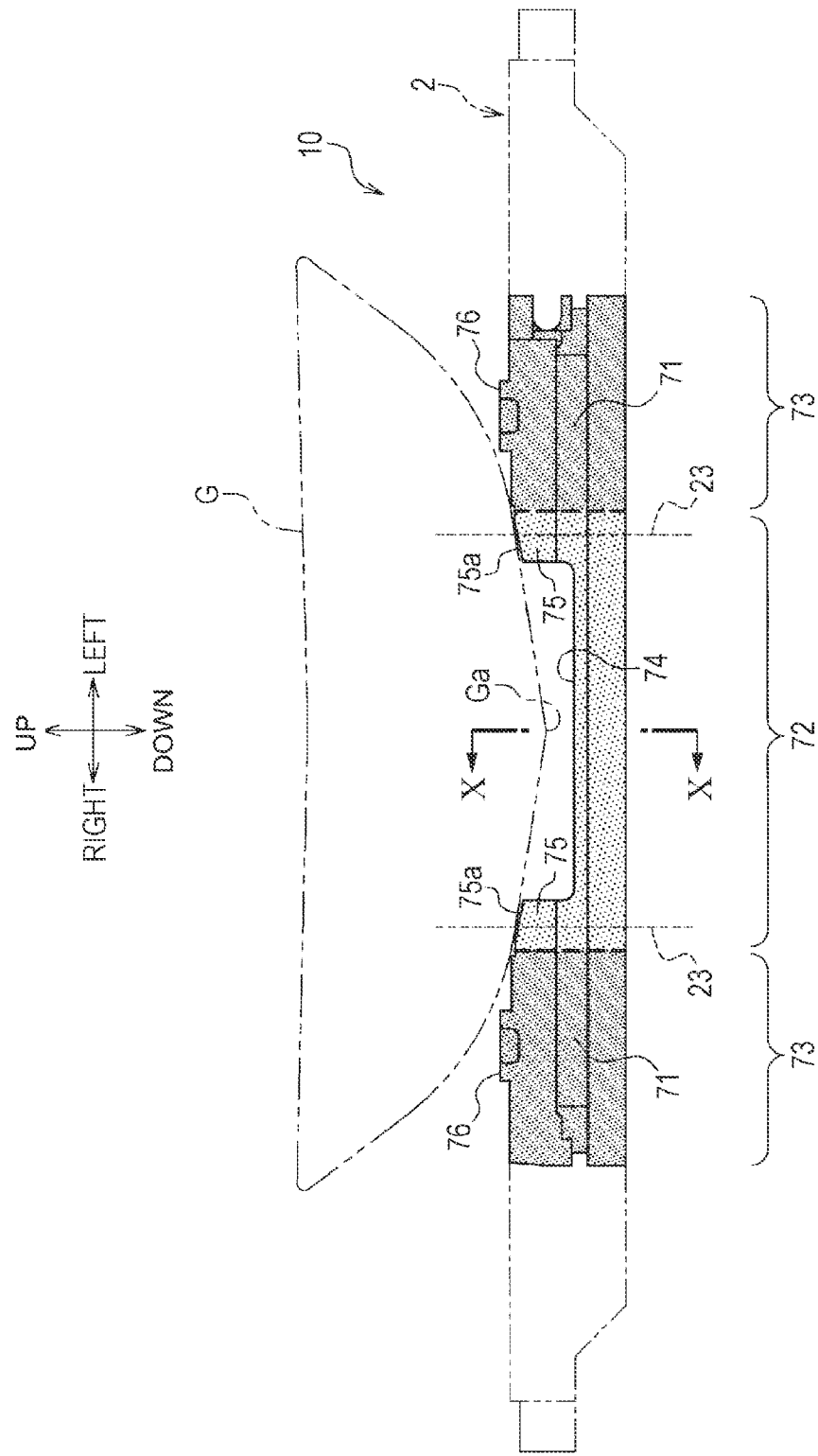
FIG. 9 is a front view of the bumper structure according to the second embodiment.
Figure 10:
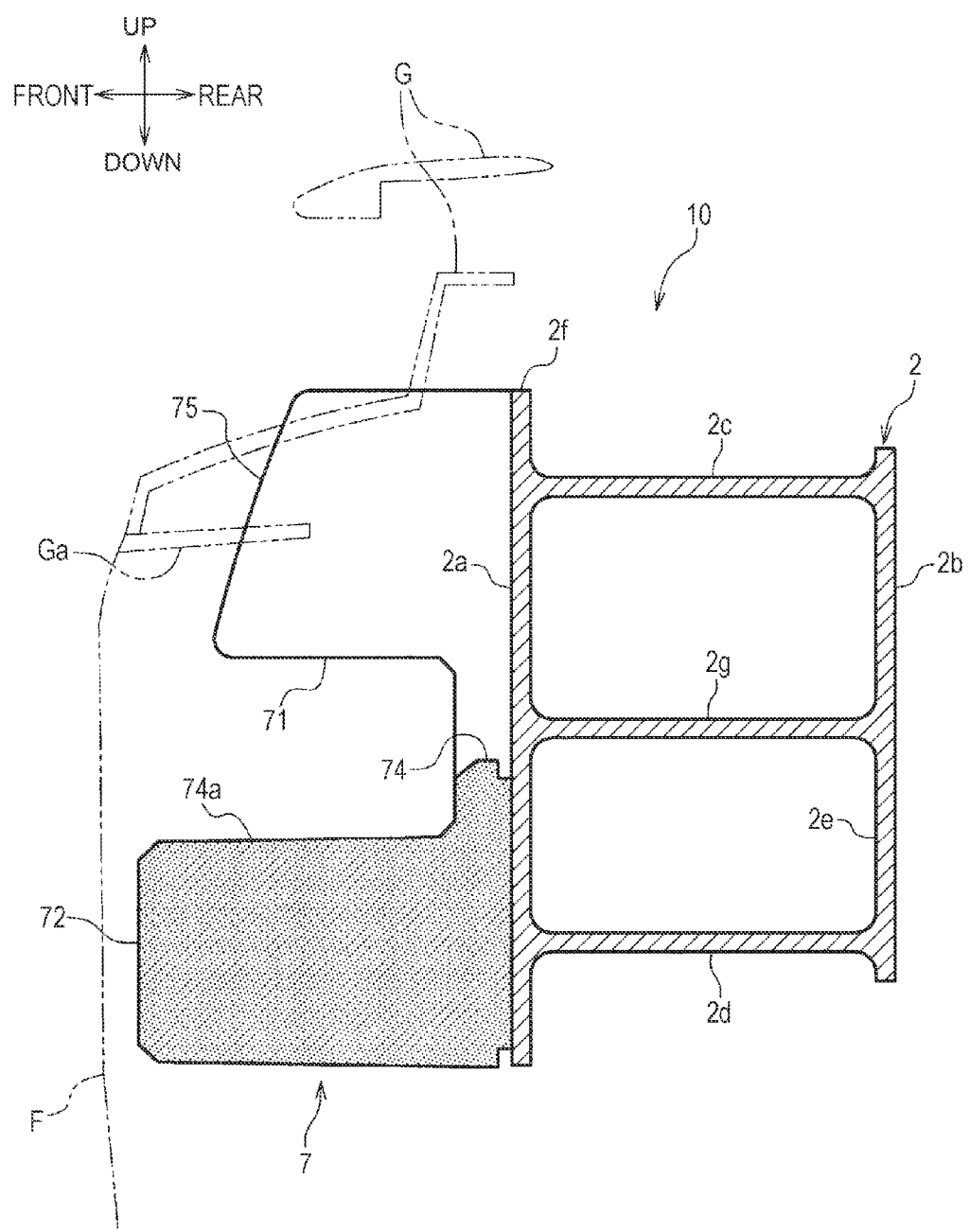
FIG. 10 is a cross-sectional view taken along line X-X of FIG. 9.

As shown in FIGS. 8 to 10, the bumper structure 10 according to the second embodiment includes the bumper beam 2, a bumper absorber 7 that is provided on the front surface of the bumper beam 2, and a pair of bumper extensions (not shown).

The major difference between the bumper structure 1 according to the above-described first embodiment and the bumper structure 10 according to the second embodiment is that the bumper absorber 7 includes a recess 71 in the vicinity of the center thereof in the up-down direction of the vehicle.

The bumper absorber 7 includes the recess 71, which is a channel like structure and extends in the vehicle width direction, in the vicinity of the center thereof in the up-down direction of the vehicle. In other words, the bumper absorber 7 is divided into two portions (upper portion and lower portion) in the up-down direction by the recess 71 therebetween.

Because of this, when the vehicle collides with another vehicle having a height greater than that of the vehicle, the portion of the bumper absorber 7 above the recess 71 will be squashed uniformly in the up-down direction. As a result, the occurrence of underride may be suppressed, and further appropriate load absorption may be provided. The recess 71 is formed so as to extend along a center portion 72 and a pair of end portions 73 and 73 both of which will be described below.

The bumper absorber 7 includes the center portion 72 and the pair of end portions 73 and 73 that extend from ends of the center portion 72 in the right-left directions. The center portion 72 is made of a foamed resin having a relatively high expansion ratio (e.g., 13.5), and the pair of end portions 73 and 73 are made of a foamed resin having a relatively low expansion ratio (e.g., 5). Therefore, appropriate distribution and absorption of a collision load may be provided in a vehicle collision.

The center portion 72 includes an opening 74 that is formed downward from the top surface of the center portion 72 so as to make a recess, and includes a pair of load receiving portions 75 and 75 that are formed outside the opening 74 in the vehicle width direction. The opening 74 exposes the front wall 2a of the bumper beam 2. The pair of load receiving portions 75 and 75 are arranged at positions corresponding to the bent portions 23 and 23 of the bumper beam 2.

As shown in FIG. 9, a part of the bottom edge Ga of the front grill G is disposed in the opening 74. The top surfaces 75a of the load receiving portions 75, which are adjacent to the opening 74, are cut away so as to incline and follow the outer shape of the bottom edge Ga of the front grill G.

The pair of end portions 73 and 73 include latch portions 76 that latch onto the bumper beam 2 on the top surface of the end portions 73 and 73.

As shown in FIG. 10, the lower side of the recess 71 constitutes a bottom surface 74a of the opening 74. The bottom surface 74a of the opening 74 is located lower than the partition wall 2g, which partitions the hollow portion 2e of the bumper beam 2 in the up-down direction. Because of this, when the bumper B1 of another vehicle (see FIG. 7) comes into contact with the front wall 2a of the bumper beam 2 through the opening 74, the collision load may be distributed by the top wall 2c and the partition wall 2g and transferred to the rear wall 2b.

In the bumper structure 10 according to the second embodiment, the bumper absorber 7 includes the recess 71, which extends in the vehicle width direction, in the vicinity of the center thereof in the up-down direction of the vehicle, and thus, the portion of the bumper absorber 7 above the recess 71 will be squashed uniformly in the up-down direction. As a result, the occurrence of underride may be suppressed, and appropriate absorption of the collision load may be provided.

Since the pair of load receiving portions 75 and 75 are arranged at positions corresponding to the bent portions 23 and 23 of the bumper beam 2, the collision load may be transferred to the bent portions 23 and 23 via the pair of load receiving portions 75 and 75.

Although the bumper structure 1 according to the first embodiment and the bumper structure 10 according to the second embodiment were described in detail above with reference to the accompanying drawings, the present disclosure is not limited to these embodiments, and it is obvious that suitable variations may be made within the scope of the present disclosure.

We claim:

1. A bumper structure comprising:
   a bumper beam extending in a vehicle width direction and supported by right and left frames of a vehicle body; and
   a bumper absorber provided along a front surface of the bumper beam, the bumper absorber including an opening in the vicinity of a center thereof in the vehicle width direction,
   wherein the bumper beam includes a center portion extending parallel to the vehicle width direction and a pair of oblique portions obliquely extending backward of the vehicle body and outward in the vehicle width direction from respective ends of the center portion such that the bumper beam includes a pair of bent portions formed at boundaries between the center portion and the respective oblique portions,
   wherein the bumper absorber includes a pair of load receiving portions outside the opening in the vehicle width direction,
   wherein the load receiving portions are arranged at positions corresponding to the respective bent portions,
   wherein the bumper beam includes a hollow portion extending in the vehicle width direction and a partition wall extending in a front-rear direction of the vehicle body to partition the hollow portion into an user portion and a lower portion, and
   wherein a lower end of the opening is located at a position corresponding to the partition wall in an up-down direction.

2. The bumper structure according to claim 1,
   wherein the vehicle body includes a bumper grill disposed in front of the bumper absorber to guide an outside air to flow into a power unit accommodating chamber of the vehicle body, and
   wherein side edges of the opening are located at respective intersection points of a bottom edge of the bumper grill and a top edge of the bumper beam when viewed from the front of the vehicle body.

3. The bumper structure according to claim 1,
   wherein the bumper absorber is made of a foamed resin including an expansion ratio in the load receiving portions different from other portions.

4. The bumper structure according to claim 1,
   wherein the bumper absorber includes a recess extending in the vehicle width direction and located in the vicinity of a center of the bumper absorber in an up-down direction of the vehicle body.

5. The bumper structure according to claim 4,
   wherein the recess is recessed toward a rearward direction of the vehicle body.

6. The bumper structure according to claim 1, wherein the opening includes a recess recessed toward a downward direction of the vehicle body.

7. A bumper structure comprising:
   a bumper beam extending in a vehicle width direction and supported by right and left frames of a vehicle body; and
   a bumper absorber provided along a front surface of the bumper beam, the bumper absorber including an opening in the vicinity of a center thereof in the vehicle width direction,
   wherein the bumper beam includes a center portion extending parallel to the vehicle width direction and a pair of oblique portions obliquely extending backward of the vehicle body and outward in the vehicle width direction from respective ends of the center portion such that the bumper beam includes a pair of bent portions formed at boundaries between the center portion and the respective oblique portions,
   wherein the bumper absorber includes a pair of load receiving portions outside the opening in the vehicle width direction,
   wherein the load receiving portions are arranged at positions corresponding to the respective bent portions, and
   wherein the bumper absorber is made of a foamed resin including an expansion ratio in the load receiving portions different from other portions.

8. The bumper structure according to claim 7,
   wherein the vehicle body includes a bumper grill disposed in front of the bumper absorber to guide an outside air to flow into a power unit accommodating chamber of the vehicle body, and
   wherein side edges of the opening are located at respective intersection points of a bottom edge of the bumper grill and a top edge of the bumper beam when viewed from the front of the vehicle body.

9. The bumper structure according to claim 7,
   wherein the bumper absorber includes a recess extending in the vehicle width direction and located in the vicinity of a center of the bumper absorber in an up-down direction of the vehicle body.

10. The bumper structure according to claim 9,
    wherein the recess is recessed toward a rearward direction of the vehicle body.

11. The bumper structure according to claim 7,
    wherein the opening includes a recess recessed toward a downward direction of the vehicle body.

* * * * *